March 16, 1926.
C. J. WHITE
TRACTOR
Filed March 29, 1924
1,577,396
2 Sheets-Sheet 1
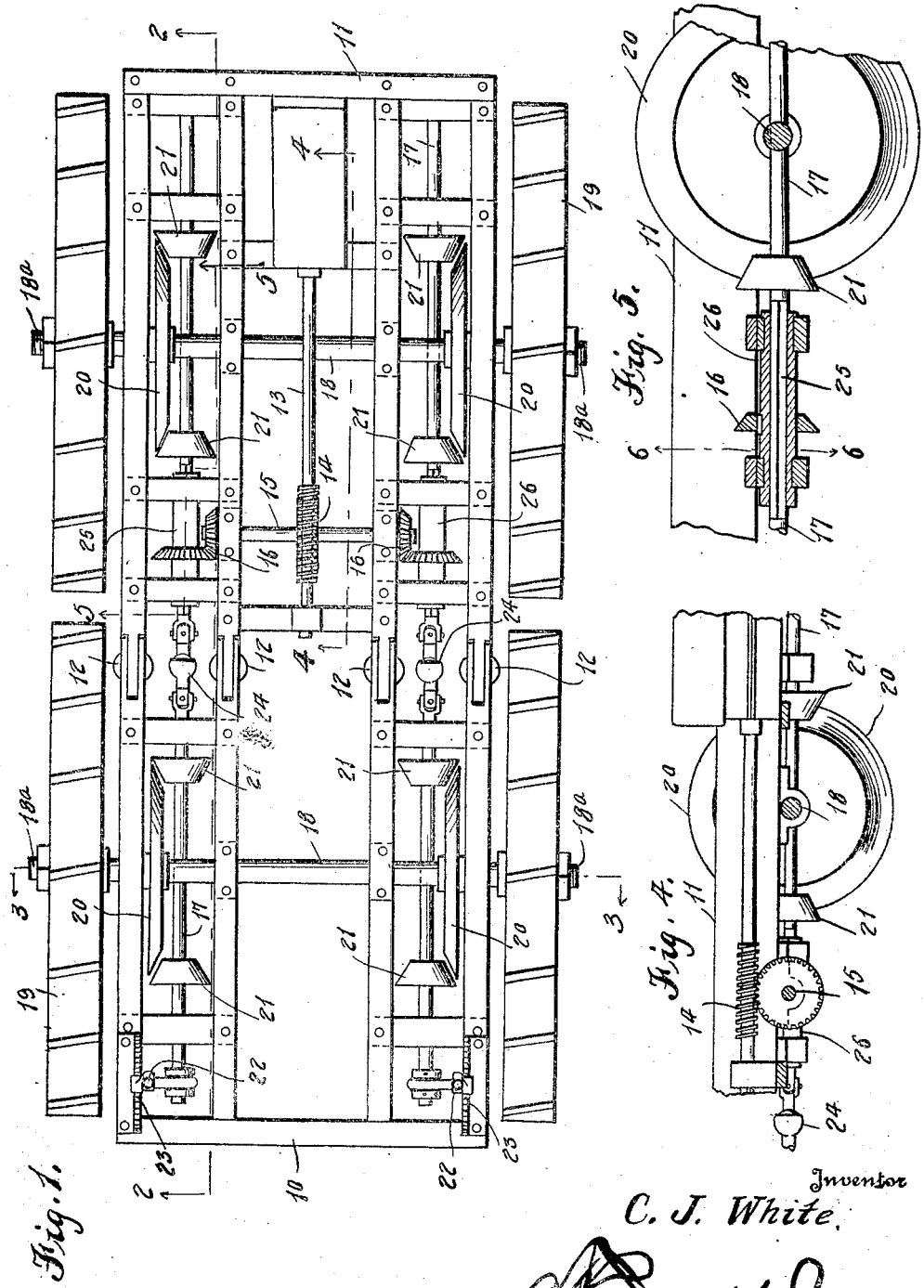
Inventor
C. J. White.
Attorney March 16, 1926. 1,577,396
C. J. WHITE
TRACTOR
Filed March 29, 1924 2 Sheets-Sheet 2
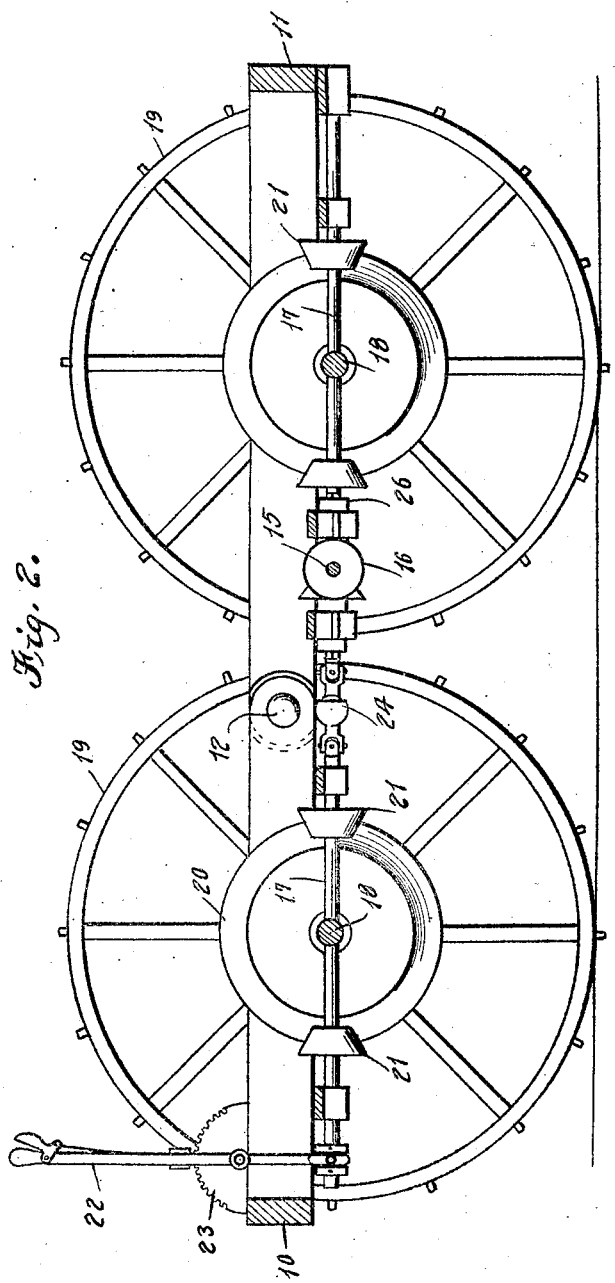
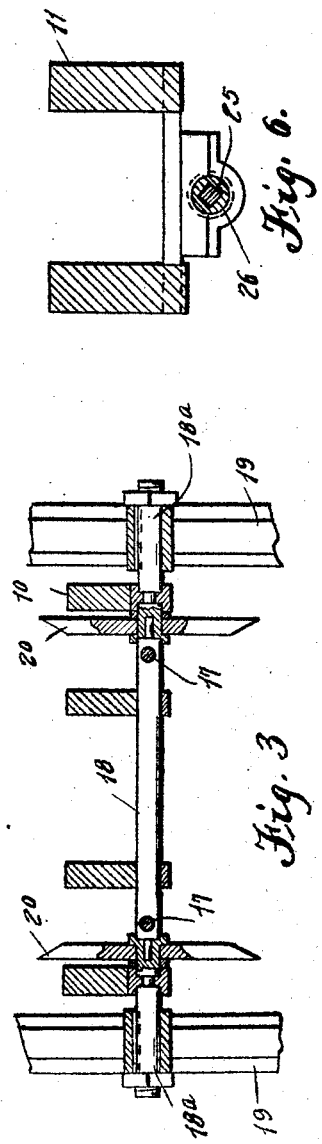
Inventor
C. J. White,
By
Attorney Patented Mar. 16, 1926.

1,577,396

UNITED STATES PATENT OFFICE.

CHARLES J. WHITE, OF KURTHWOOD, LOUISIANA.

TRACTOR.

Application filed March 29, 1924. Serial No. 702,888.

*To all whom it may concern:*

Be it known that I, CHARLES J. WHITE, a citizen of the United States, residing at Kurthwood, in the parish of Vernon and State of Louisiana, have invented certain new and useful Improvements in Tractors; and I do hereby declare the following to be a full, clear, and exact description of the invention, such as will enable others skilled in the art to which it appertains to make and use the same.

The present invention relates to a machine for drawing heavy loads and has for its object to positively drive each of the four wheels and to dispense with the usual steering mechanism, the guiding being effected by driving opposite wheels at different speeds, according to the nature and direction of turn to be made.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of the running gear of a tractor embodying the invention, Figure 2 is a vertical longitudinal section on the line 2—2 of Figure 1, Figure 3 is a vertical transverse sectional view on the line 3—3 of Figure 1, Figure 4 is a vertical longitudinal section on the line 4—4 of Figure 1, Figure 5 is a detail sectional view on the line 5—5 of Figure 1, and Figure 6 is a sectional detail on the line 6—6 of Figure 5.

Corresponding and like parts are referred to in the following description and designated in the several views of the drawings by like reference characters.

The frame of the running gear may be of any preferred construction and comprises sections 10 and 11 which are hingedly connected at their inner or contiguous ends, as indicated at 12. The drive shaft 13 is connected by suitable gearing 14 to a transverse shaft 15 which in turn is connected by gearing 16 to longitudinal shafts 17. The shafts 17 are disposed at the sides of the frame and may be mounted in any preferred way. The axles 18 are provided with tractor wheels 19 which are rotatable therewith and constitute drivers. A bevel friction wheel 20 is fast to opposite ends of each of the axles 18 and each of the longitudinal shafts 17 is provided with a pair of friction wheels 21 for cooperation with each of the friction wheels 20, and these friction wheels 21 are fast to the shafts 17 to move longitudinally therewith to admit of being thrown into or out of gear with the cooperating friction wheels 20, whereby the tractor may be caused to move forwardly or backwardly, or to make a right or a left turn as required.

The longitudinal shafts 17 are mounted to move axially and are adjusted by means of levers 22 which are held in the required adjusted position by means of a toothed segment 23 and the usual latch. Each of the shafts 17 comprises sections which are connected at their inner ends by means of a universal coupling 24, which is in line with the pivot connection 12 of the frame sections 10 and 11. One of the shaft sections has a square portion 25 which is mounted in a sleeve 26 so as to rotate therewith but free to move longitudinally therein. One of the elements of the gearing 16 is fast to the sleeve 26 to turn therewith. The axles 18 are fixed and the shafts 17 pass therethrough. The spindle arms 18ª, to which the drive wheels 19 and the friction wheels 20 are attached, are loose so as to rotate freely (Fig. 3).

What is claimed is:

A tractor having a frame, front and rear wheels, an axle on said frame for the front wheels, an axle on said frame for the rear wheels, a driving gear on each axle at each side of the frame, longitudinally disposed shafts one at each side of the frame, means operable to drive said shafts, means operable to slide said shafts longitudinally, and drive members on said shafts to coact with the first mentioned drive members through movement of the longitudinal shafts in both directions to control the direction of movement of the tractor, said longitudinally extending shaft having universal joints therein intermediate their ends, and said frame being in sections pivoted together on an axis substantially passing through the universal joint.

In testimony whereof I affix my signature.

CHARLES J. WHITE.